United States Patent [19]

Epple et al.

[11] Patent Number: 5,608,012
[45] Date of Patent: Mar. 4, 1997

[54] COPOLYMERS, THEIR PREPARATION, AND THEIR USE IN HIGH-SOLIDS COATING COMPOSITIONS

[75] Inventors: Ulrich Epple; Uwe Kubillus; Holger Schmidt, all of Wiesbaden, Germany

[73] Assignee: Hoechst Aktiengesellschaft, Frankfurt, Germany

[21] Appl. No.: 436,719

[22] Filed: May 8, 1995

Related U.S. Application Data

[62] Division of Ser. No. 278,065, Jul. 20, 1994, abandoned.

[30] Foreign Application Priority Data

Aug. 9, 1993 [DE] Germany ............ 43 26 656.8

[51] Int. Cl.⁶ .................. C08F 8/30; C08F 220/32; C08F 220/02; C08F 220/10; B32B 27/28
[52] U.S. Cl. ............ 525/374; 525/327.3; 525/329.7; 525/330.3; 428/500
[58] Field of Search .............. 525/374, 327.3, 525/329.7, 330.3; 428/500

[56] References Cited

U.S. PATENT DOCUMENTS

| | | | |
|---|---|---|---|
| 4,131,572 | 12/1978 | Brendley, Jr. ............ | 260/17 R |
| 4,145,513 | 3/1979 | Dalibor ............ | 528/75 |
| 4,350,809 | 9/1982 | Fischer et al. ............ | 528/361 |
| 4,710,556 | 12/1987 | Plum ............ | 526/273 |
| 5,136,004 | 8/1992 | Bederke et al. ............ | 526/273 |
| 5,179,157 | 1/1993 | Dalibor ............ | 524/548 |
| 5,371,167 | 12/1994 | Rehfuss et al. ............ | 528/73 |

FOREIGN PATENT DOCUMENTS

| | | |
|---|---|---|
| 2048444 | 2/1992 | Canada . |
| 0398387 | 11/1990 | European Pat. Off. . |
| 0408858 | 1/1991 | European Pat. Off. . |
| WO90/03991 | 4/1990 | WIPO . |
| 92/18255 | 10/1992 | WIPO . |

OTHER PUBLICATIONS

Gordon et al., "Ideal Copolymers And The Second–Order Transitions Of Synthetic Rubbers", *J. appl. Chem.*, pp. 493–500, (1952).

Fox, "Third Session of DHPP", *Bull. Amer. Phys. Loc.*, pp. 122–123, (1956).

*Primary Examiner*—Joseph L. Schofer
*Assistant Examiner*—Wu C. Cheng
*Attorney, Agent, or Firm*—Foley & Lardner

[57] ABSTRACT

Copolymers of particularly low viscosity, which can be prepared by a polymerization in bulk, in which one component (A) is initially charged and, in the further course of the polymerization, at least two olefinically unsaturated copolymerizable monomers (B) are added, of which at least one contains at least one COOH group and at least one is sterically-hindered are usefully employed in coating compositions.

20 Claims, No Drawings

COPOLYMERS, THEIR PREPARATION, AND THEIR USE IN HIGH-SOLIDS COATING COMPOSITIONS

This application is a division, of application Ser. No. 08/278,065, filed Jul. 20, 1994 abandoned.

BACKGROUND OF THE INVENTION

The present invention relates to copolymers for use in high-solids coating compositions.

An advantage of high-solids coating compositions is reduced emission of organic compounds when a coating material is applied. In order to obtain these high-solids coating formulations it is necessary, for example, to employ appropriate acrylate resins having low viscosities, i.e., low molar masses.

It is well known that in order to prepare low-viscosity polymers it is possible to employ free-radical solution polymerization. See EP 408 858, EP 398 387, U.S. Pat. No. 4,145,513, and WO 92/18255. The disadvantage of these processes is that the properties of the polymers are adversely affected by the use of considerable quantities of polymerization initiators and polymerization regulators, and also by the formation of secondary products, some of which are not incorporated into the polymer chain. In particular, the polymerization regulators used, for example thiols, can have a foul odor or may even be toxic.

The polymers obtained by free-radical solution polymerization at high pressure and/or at high temperature in high-boiling solvents do not have these disadvantages but, because of their very low molar masses, they frequently have glass transition temperatures which are too low to permit their use as binders for coating. This results in the coatings of these materials having dust-dry times and tack-free drying times which may be of indeterminate length. In addition, some systems have a processing time which is inadequate for commercial application.

Bulk polymerization is also known, see EP 0 027 931 and EP 0 056 971, in which one component, for example a glycidyl ester or a maleate, is the initial charge in a polymerization and can thus act as solvent. This ester or this monomer, respectively, is incorporated completely into the copolymer during the subsequent course of the polymerization with the addition of monomers (further monomers in the case of maleate). These copolymers can be used to prepare binders for high-solids coating materials.

The great advantage of bulk polymerization, in comparison to a pure mass polymerization, is in the efficient dissipation of the heat of reaction and in the free choice of the solvents for dilution once the reaction has concluded. The correct choice of the reaction parameters, in particular of the reaction temperature, then leads to products with low viscosities and a high solids content in a finished coating formulation.

However, the successive increase in the reaction temperature of the products of EP 0 027 931 and of DE-P43 24 801.2 results in products which, although having very low molar masses and consequently very low viscosities as a result, also had glass transition temperatures below room temperature (20° C.) and possessed drying times which were consequently too long to permit use as coating compositions.

At very low molar masses in particular, there is a heavy dependency of the glass transition temperature on the molar mass. Attempts to predict the glass transition temperatures of these low molecular weight copolymers by the Gordon-Taylor equation (M. Gordon, J. S. Taylor, J. Appl. Chem. USSR, 2, 493, 1952) or the Fox equation (T. G. Fox, Proc. Amer. Phys. Soc. 1, 123, 1956) ended in failure. Not the least of the reasons for this is that these additivity equations for the glass transition temperature take into account only the composition of the copolymers and not the varying dependency of the glass transition temperature on the molar mass of the corresponding homopolymers and copolymers in this range.

SUMMARY OF THE INVENTION

An object of the present invention is therefore to prepare, if possible by the advantageous bulk polymerization process, a new, hydroxyl group-containing copolymer which, despite very low molar masses, i.e., very low viscosities, has a sufficiently high glass transition temperature to be suitable for use in coatings.

It is also an object of the present invention to provide copolymers which can be produced by bulk polymerization and to provide coating compositions containing such copolymers.

In accordance with a first aspect of the present invention, there has been provided a copolymer having a low solution viscosity which is prepared by polymerizing a first component (A) and adding during the course of polymerization of (A) at least two olefinically unsaturated copolymerizable monomers (B), at least one of which contains at least one COOH group and at least one of which is sterically hindered.

In accordance with a second aspect of the present invention there has been provided a process for preparing a copolymer as described above by (a) charging component (A) to a vessel, and (b) during the polymerization of (A) adding component (B) and a free-radical initiator which polymerizes with (A) to form the copolymer.

In accordance with other aspects of the present invention there has been provided coating compositions containing the described copolymer and substrates coated with such compositions.

Further objects, features, and advantages of the present invention will become apparent from the detailed description of preferred embodiments which follows.

DETAILED DESCRIPTION OF THE PREFERRED EMBODIMENTS

Surprisingly it now has been found that, by using particular sterically-hindered monomers, it is possible to obtain desirable, very low-viscosity copolymers, which still have glass transition temperatures above room temperature (20° C.). These new copolymers have very low molar masses and are of optimum suitability as components of coating compositions.

The invention therefore relates to low-viscosity copolymers which are accessible by a bulk polymerization in which one component is the initial charge in the polymerization. In the further course of the polymerization at least two further, olefinically-unsaturated monomers are added, one of which at least contains at least one COOH group.

The copolymers according to the invention are particularly distinguished by their content of hydroxyl groups and their extremely low viscosity. Preferred copolymers of the present invention are acrylate copolymers having an OH number of from 40 to 250 mg of KOH/g, a glass transition temperature of more than 20° C. (measured at a heat-up rate of 10 K/min), a low solution viscosity of from 10 to 2000 mPa.s (50% strength solution; 23° C. (DIN 53018)) and a number average molar mass $M_n$ of less than 5000 g/mol. Preferably, the solution viscosity is below 1000 mPa.s, especially preferred below 500 mPa.s.

The preferred hydroxy group containing copolymers with very low viscosity, according to the invention, are obtained by the reaction of a component (A) and a component (B) which comprises at least one olefinically unsaturated monomer containing at least one functional group which is conserved throughout the polymerization, and at least one monomer which is sterically hindered, wherein component (A) has functional groups that react with the functional groups of the polymer of (B) under formation of a chemical bond and a hydroxy group.

Example for such functional groups in (A) are epoxy groups when the functional group in (B) is an acid group, isocyanate groups when the functional group in (B) is an isocyanate reactive hydrogen atom, preferably of a hydroxy group, an acid anhydride or ketene group when the functional group in (B) is a hydroxy or amino group, etc., or vice versa. Virtually any pair of functional groupings can be employed if the reaction goes to completion.

Preferably, according to the invention, component (A) has epoxy functional groups, especially preferred glycidyl ester groups, and at least one of the monomers (B) has carboxylic acid groups.

Preferred copolymers are formed from (A) from 5 to 50, preferably 7 to 45, more preferably 9 to 40, % by weight of glycidyl esters of aliphatic, saturated monocarboxylic acids containing a tertiary or quaternary α carbon atom, and (B) from 95 to 50, preferably 93 to 55, more preferably 91 to 60, % by weight of at least two olefinically unsaturated copolymerizable monomers, of which at least one contains at least one COOH group and at least one is a sterically-hindered monomer.

Suitable compounds that can be used as component (A) to yield hydroxy group containing polymers are epoxy compounds or cyclic carbonates. If isocyanate compounds are used as component (A), urethane or urea groups rather than hydroxy groups are formed in the resulting polymer. As component (A) it is preferred to use glycidyl esters of α-alkylalkanemonocarboxylic acids and/or α,αdialkylalkanemonocarboxylic acids, individually or as a mixture.

The compounds (A) are selected, for example, from the glycidyl ester of 2,2-dimethylpropionic acid and/or the neo acids, such as neodecanoic (C10) acid or neononanoic (C9) acid or 10,10-dimethylundecanoic acid. The alkyl radicals in these acids may have a different number of carbon atoms.

In general, the total number of carbon atoms in the starting monocarboxylic acids for the glycidyl esters is between 4 and 30, in particular between 5 and 20.

Component (B) can be selected from any mixture of comonomers having the parameters set forth above and generally comprises a mixture of (B1) one or more olefinically-unsaturated monomers having at least one group that is reactive towards the functional groups of (A), preferably a COOH group, and (B2) one or more olefinically-unsaturated, sterically-hindered monomers, and if desired one or more of components (B3) to (B5), (B3) one or more hydroxyalkyl esters of α,β-unsaturated carboxylic acids, (B4) one or more esters of an α,β-unsaturated carboxylic acid with a monohydric aliphatic alcohol of 1 to 20 carbon atoms, and (B5) one or more olefinically-unsaturated compounds not included in (B1), (B2), (B3) or (B4).

The compounds (B1) are selected, for example, from the acidic acrylic monomers such as acrylic and methacrylic acid, maleic, fumaric and itaconic acid and their half-esters, and crotonic acid, isocrotonic acid and vinylacetic acid. They should be available in a sufficient quantity for the reaction with component (A) to proceed completely and preferably to result in a product having an acid number of at least 2, preferably between 5 and 50, mg of KOH/g.

In components (B2) to (B5) mentioned below, as well, the term "α,β-unsaturated carboxylic acids" also includes the dicarboxylic acids, for example, maleic acid, fumaric acid and itaconic acid, and their half-esters.

The compounds (B2) are preferably olefinically-unsaturated, sterically-hindered monomers whose homopolymers have glass transition temperatures of more than 45° C., measured at a sufficiently high molar mass at which there is no longer any dependency of the glass transition temperature on the molar mass. These compounds contain at least one C-C double bond, and also a branched carbon chain and/or a cyclic structure. In the text below the term cyclic structure includes all mono- and polycyclic structures. Sterically hindered in this context means that the free rotation of molecule segments is hindered by bulky substituents, cyclic structures, or other conformational barriers like intramolecular secondary valence bonding.

Sterically-hindered, ethylenically-unsaturated monomers suitable for the preparation of the polymers according to the invention include esters of α,β-unsaturated carboxylic acids, such as acrylic acid and methacrylic acid, with sterically-hindered alcohols and sterically-hindered vinyl monomers. The sterically-hindered alcohols may be aliphatic, branched or cyclic alcohols or aromatic alcohols. The sterically-hindered alcohols may also combine two or more of these structural characteristics.

Suitable aliphatic, branched, noncyclic esters of methacrylic acid or acrylic acid may be prepared from these acids and one or more branched, noncyclic, saturated or unsaturated alcohols generally of 3 to 30 carbon atoms, in particular 4 to 20 carbon atoms.

Suitable saturated alcohols useful in preparing the sterically hindered monomers include tert-butyl alcohol, tert-amyl alcohol, 2-methylbutanol, 3-methylbutanol, neopentyl alcohol, 3-methyl-2-butanol, 2-pentanol, 3-pentanol, 2,3-dimethyl-2-butanol, 3,3-dimethylbutanol, 3,3-dimethyl-2-butanol, 2-ethyl-2-butanol, 2-hexanol, 3-hexanol, 2-methylpentanol, 2-methyl-2-pentanol, 2-methyl-3-pentanol, 3-methylpentanol, 3-methyl-2-pentanol, 3-methyl-3-pentanol, 4-methylpentanol, 4-methyl-2-pentanol, 2-(2'-hexyloxyethoxy)ethanol, 2,2-dimethyl-3-pentanol, 2,3-dimethyl-3-pentanol, 2,4-dimethyl-3-pentanol, 4,4-dimethyl-3-pentanol, 3-ethyl-3-pentanol, 2-heptanol, 3heptanol, 2-methyl-2-hexanol, 2-methyl-3-hexanol, 5-methyl-2-hexanol, 2-ethylhexanol, 4-methyl-3-heptanol, 6-methyl-2-heptanol, 2-octanol, 3-octanol, 2-propylpentanol, 2,4,4-trimethylpentanol, 2,6-dimethyl-4-heptanol, 3-ethyl-2,2-dimethyl-3-pentanol, 2-nonanol, 3,5,5-trimethylpentanol, 3,5,5-trimethylhexanol, 2-decanol, 4-decanol, 3,7-dimethyloctanol, 3,7-dimethyl-3-octanol, 2-dodecanol and 2-tetradecanol. Other suitable alcohols are commercially available mixtures of branched alcohols, marketed for example by Exxon Chemical under the tradenames Exxal 6, Exxal 7 to Exxal 13. (The number after the tradename indicates the number of carbon atoms in the alcohols.)

Examples of suitable unsaturated alcohols useful in preparing the sterically hindered monomers are 1-hexen-3-ol, phytol (=3,7,11,15-tetramethyl-2-hexadecen-1-ol), 3-methyl-1-penten-3-ol, 4-methyl-3-pentenol, 2-methyl-3butenol, 3-methyl-3-buten-2-ol, 3-methyl-2-butenol, 3-methyl-3-butenol, 1-penten-3-ol, 3-penten-2-ol, 4-penten-2-ol, 6-methyl-5-hepten-2-ol, 1-octen-3-ol, nopol (=dimethyl-2-[2-hydroxyethyl]bicyclo[3.1.1]hepten-2-ol) and oleyl alcohol.

Other suitable sterically-hindered monomers are esters of acrylic or methacrylic acid with cyclic aliphatic alcohols generally of 5 to 30 carbon atoms, in particular of 6 to 20 carbon atoms, for example, cyclohexanol, 4-tert-butylcyclohexanol, 3,3,5-trimethylcyclohexanol, isoborneol, (8/9)-hydroxytricyclo-[5.2.1.0$^{2,6}$]dec-3-ene (dihydrodicyclopentadienyl alcohol), 8-hydroxy-tricyclo[5.2.1.0$^{2,6}$]decane, 8-hydroxymethyl-tricyclo[5.2.1.0$^{2,1}$]decane and citronellol.

Further suitable esters of acrylic or methacrylic acid can be prepared, for example, using the following alcohols (aralkanols): trans-2-phenylcyclohexanol, 6-phenylhexanol, 3,5-bis(trifluoromethyl)benzyl alcohol, cyclopropyldiphenylmethanol, 1,1,1,3,3,3-hexafluoro-2-phenylpropan-2-ol, 2-bromo-1-indanol, 1-indanol, 2-indanol, 5-indanol, 3-chloro-1-phenylpropan-1-ol, 3,5-dimethylbenzylalcohol, 1-phenylpropan-2-ol, 2,3-dihydro-2,2-dimethylbenzofuran-7-ol and 2-methoxyphenylethyl alcohol.

Suitable phenyl and naphthyl esters of acrylic or methacrylic acid can be prepared, for example, from one or more of the following hydroxyaromatic compounds, which may also be substituted by one or more alkyl/alkoxy groups of one to eight carbon atoms: 2-cyclopentylphenol, 2,6-di-tert-butyl-4-methylphenol, nonylphenol, 2,4,6-tri-tert-butylphenol, 1,2,3,4-tetrahydro-1-naphthol, 5,6,7,8-tetrahydro-1-naphthol, 5,6,7,8-tetrahydro-2-naphthol, 2-sec-butylphenol, 2-tert-butylphenol, 3-sec-butylphenol, 3-tert-butylphenol, 4-sec-butylphenol, 4-tert-butylphenol, 2,3,5-trimethylphenol and 2,6-dimethylphenol.

Examples of sterically-hindered, cyclic vinyl monomers which are suitable for the copolymers according to the invention are styrene, 4-phenylstyrene, vinylcyclohexane, vinylcyclooctane, vinylcyclopentane, vinyl 2-ethylhexanoate, norbornene, 1,4,6,8-dimethanooctahydronaphthalene, 5-vinyl-2-norbornene, limonene, tert-butylstyrene, α-methylstyrene, 4-methylstyrene, one or more of the isomeric vinyltoluenes, as a mixture if appropriate, ethylidenenorbornene and alkyl- or alkoxystyrenes having 1 to 8 carbon atoms in the alkyl or alkoxy group. Styrene is especially useful, since it is an inexpensive standard monomer. It is therefore usually one constituent of component (B2).

The hydroxyalkyl esters in accordance with B3 are generally halfesters of α,β-unsaturated monocarboxylic acids with aliphatic diols of 2 to 30, in particular 2 to 20, carbon atoms. Examples of half-esters with a primary hydroxyl group are hydroxyethyl acrylate, hydroxypropyl acrylate, hydroxybutyl acrylate, hydroxyamyl acrylate, neopentylglycol monoacrylate, hydroxyhexyl acrylate, hydroxyoctyl acrylate and the corresponding methacrylates. Examples of hydroxyalkyl esters which can be used and have a secondary hydroxyl group are 2-hydroxypropyl acrylate, 2-hydroxybutyl acrylate, 3-hydroxybutyl acrylate and the corresponding methacrylates.

It is also possible to employ as component (B3) in each case the corresponding esters of other α,βunsaturated carboxylic acids, for example of crotonic acid, isocrotonic acid and vinylacetic acid. Of equal suitability are reaction products of one mole of hydroxyethyl acrylate and/or hydroxyethyl methacrylate and, on average, two moles of ε-caprolactone. Other suitable hydroxyl group-containing esters are derived from the α,β-unsaturated carboxylic acids and the oligomeric alkylene glycols such as oligoethylene and oligopropylene glycol. Other suitable compounds are half-esters of α,β-unsaturated monocarboxylic acids with cycloaliphatic diols such as 1,4-cyclohexanedimethanol, 3(4),8(9)-bis(hydroxymethyl)tricyclo[5.2.1.0$^{2,6}$]decane or dihydroxyaromatic compounds such as pyrocatechol and hydroquinone.

The compounds in accordance with (B4) are selected, for example, from esters of α,β-unsaturated monocarboxylic acids with aliphatic, monohydric, unbranched alcohols of 1 to 20 carbon atoms, such as methyl, ethyl, butyl, hexyl, lauryl, stearyl, isopropyl and 2-amyl acrylate or methacrylate. Also suitable are esters of these alcohols with, for example, crotonic acid, isocrotonic acid or vinylacetic acid. Methyl and ethyl acrylate and their methacrylates are particularly preferred.

The compounds in accordance with (B5) are selected, for example, from the group of acrylic or methacrylic esters with halogenated alcohols, for example trifluoroethyl, pentafluoro-n-propyl and hexachlorobicycloheptenyl acrylate, the esters of halogenated acrylic acids, such as methyl 2-fluoroacrylate or dibromophenyl 2-fluoroacrylate, vinyl esters such as vinyl acetate, halogenated vinyl compounds such as vinyl chloride, vinylidene chloride and vinylidene fluoride, and halogenated aromatic vinyl compounds such as chlorostyrene. All compounds mentioned under B1 to B4 which are in addition substituted by halogen are likewise included in this group. Components B1 to B4 may be present in any desired proportion so as to give the desired copolymer.

In the initial monomer mixture, component (B) preferably comprises a mixture of (B1) from 1 to 20% by weight, preferably from 3 to 15% by weight, of an α,β-unsaturated monocarboxylic acid, preferably acrylic or methacrylic acid or mixtures thereof, (B2) from 1 to 85% by weight, preferably from 3 to 80% by weight, of an olefinically-unsaturated, sterically-hindered monomer or mixtures of two or more such monomers, (B3) from 0 to 45% by weight, preferably from 10 to 45% by weight, of a hydroxyalkyl ester of acrylic acid or methacrylic acid or mixtures of two or more such esters, (B4) from 0 to 60% by weight, preferably from 5 to 55% by weight, of an ester of acrylic or methacrylic acid with a monohydric aliphatic alcohol, or mixtures of two or more such esters, (B5) from 0 to 60% by weight, preferably from 5 to 55% by weight, of at least one olefinically-unsaturated compound as described above, the sum of components B always being 100 and the sum of the esters preferably being not more than 95% by weight.

Particularly suitable monomers are (B1) acrylic acid and methacrylic acid, (B2) the tert-butyl, cyclohexyl, 4-tert-butylcyclohexyl, 3,3,5-trimethylcyclohexyl, isobornyl, 2-ethylhexyl and dihydrodicyclopentadienyl esters of acrylic and methacrylic acid, and styrene and α-methylstyrene, (B3) the hydroxyethyl, hydroxypropyl and hydroxybutyl esters of acrylic and methacrylic acid, (B4) the methyl, ethyl, butyl, pentyl, hexyl, lauryl and stearyl esters of acrylic and methacrylic acid, and (B5) fluorinated and chlorinated acrylic esters, such as trifluoroethyl acrylate, pentafluoropropyl methacrylate and methyl 2-fluoroacrylate, and fluorinated and chlorinated aromatic vinyl compounds, such as 4-chloro- or 4-fluorostyrene.

During the polymerization reaction, the acidic monomers and the initial charge of glycidyl ester react to form a product which is present in the copolymer according to the invention, in general, in a proportion of from 6 to 60% by weight, preferably from 10 to 55% by weight of the copolymer.

For the copolymers according to the invention, suitable polymerization initiators are the conventional free radical-forming compounds, which can be used individually or as a mixture. Examples of such initiators are aliphatic azo compounds, diacyl peroxides, peroxydicarbonates, alkyl per-esters, alkyl hydroperoxides, perketals, dialkyl peroxides or ketone peroxides. Dialkyl peroxides such as di-t-butyl peroxide or di-t-amyl peroxide and alkyl per-esters such as t-butyl peroxy-2-ethylhexanoate or t-amyl peroxy-2-ethylhexanoate are preferred. The proportion of the initiators may, for example, be from 0.5 to 5% by weight, preferably up to 4% by weight and in particular up to 3% by weight, based on the overall weight of the starting components.

The polymerization is preferably carried out in bulk as a mass polymerization at the end of polymerization. The term "bulk polymerization" refers to a polymerization which generally is carried out without solvents. In some cases, however, the presence of a small proportion of solvent, namely up to 20% by weight, preferably up to 10% by weight and in particular up to 8% by weight, based on the total weight of starting components, is also possible. However, working without solvents is preferred.

The polymerization is carried out by initially charging component (A), the glycidyl ester, and reacting it conventionally, generally at from 100° to 210° C., preferably between 120° and 200° C., with component (B) and at least one free-radical initiator in a bulk polymerization until a degree of conversion of at least 95%, preferably at least 96%, has been reached.

The hydroxyl group-containing copolymers prepared can be modified further in a subsequent step, for example, by reacting them with isocyanate compounds which, for example, contain per molecule on average from 0.8 to 1.5 free NCO groups and at least one tertiary amino group. In this case, the solvent employed in the polymerization, if any, i.e., the preparation of the polymers, should be inert with respect to these isocyanate compounds.

These isocyanate compounds also include, for example, all low molecular weight urea derivatives which, in the paint industry, lead to "sag-controlled" acrylate resins.

The acrylate resins according to the invention can be identified by their OH groups, which in general result in an OH number of from 40 to 250 mg of KOH/g, preferably from 70 to 200 and in particular from 80 to 180 mg of KOH/g, and by a glass transition temperature of more than 15, preferably more than 20° C. (measured at a heat-up rate of 10 K/min). In addition, the polymers according to the invention possess a particularly low solution viscosity. This viscosity is generally in the range from 10 to 2000 mPa·s, preferably from 15 to 1000 and in particular from 20 to 500 mPa·s [50% strength solution; 23° C. (DIN 53018)]. The polymers typically possess average molar masses (number average) of less than 5000 g/mol, preferably from 300 to 4500 and in particular from 500 to 4000 g/mol.

The copolymers according to the invention are particularly well suited to coatings applications in 2-component systems, especially for so-called high-solids systems, i.e., for solvent-containing mixtures with a high solids content (more than 50%).

Any desired solvent can be used in the coating composition. Examples of suitable solvents for coating compositions containing the copolymers obtained in accordance with the invention are aliphatic, cycloaliphatic and/or aromatic hydrocarbons, such as alkylbenzenes, for example, xylene or toluene; esters, such as ethyl acetate, butyl acetate, acetates with longer alcohol residues, butyl propionate, pentyl propionate, ethylene glycol monoethyl ether acetate, the corresponding methyl ether acetate; ethers, such as ethylene glycol acetate monoethyl, methyl or butyl ether; glycols; alcohols; ketones, such as methyl amyl ketone or methyl isobutyl ketone; lactones, or the like, or mixtures of such solvents.

The present invention also relates to coating compositions which contain the hydroxyl group-containing copolymers according to the invention as binder component. The copolymers may be cured in the presence of any suitable crosslinking agents without heat or at elevated temperature.

Suitable curing components in these coating compositions are amino resins, polyisocyanates or compounds which contain anhydride groups, alone or in combination. The crosslinking agent is in each case added in a quantity such that the molar ratio of the OH groups of the copolymer to the reactive groups of the crosslinking agent generally is between 0.3:1 and 3:1.

Amino resins which are suitable as the curing component are preferably urea, melamine and/or benzoguanamine resins. These are etherified condensation products of urea, melamine or benzoguanamine with formaldehyde. Suitable mixing ratios are in the range from 50:50 to 90:10 in terms of copolymer/amino resin crosslinking agent, based on solid resin. Appropriate phenolic resins and their derivatives also can be employed as curing agents. In the presence of acids, for example, p-toluenesulfonic acid, these crosslinking agents lead to full curing of the coating. Heat curing can be undertaken conventionally at temperatures of from 80° to 200° C. over, for example, from 10 to 30 minutes.

Polyisocyanates are suitable for curing the copolymers according to the invention, accompanied by crosslinking, especially at moderate temperatures or at room temperature. Suitable polyisocyanate components are, in principle, all aliphatic, cycloaliphatic or aromatic polyisocyanates which are known from polyurethane chemistry, alone or as mixtures. Particularly suitable examples are low molecular weight polyisocyanates such as, for example, hexamethylene diisocyanate, 2,2,4- and/or 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane or mixtures of these isomers with their higher homologs, as are accessible in a manner known per se by phosgenization of aniline/formaldehyde condensation products, and also 2,4- and/or 2,6-diisocyanatotoluene, or any mixtures of such compounds.

However, derivatives of these simple polyisocyanates are preferably employed, as are conventional in coating technology. These include polyisocyanates which contain, for example, biuret groups, uretdione groups, isocyanurate groups, urethane groups, carbodiimide groups or allophanate groups, as are described, for example, in EP 0 470 461. The particularly preferred modified polyisocyanates include N,N',N"-tris(6-isocyanatohexyl)biuret and its mixtures with its higher homologs, as well as N,N',N"-tris(6-isocyanatohexyl) isocyanurate and its mixtures with its higher homologs containing more than one isocyanurate ring.

The crosslinking can be catalyzed by adding an organometallic compound, such as tin compounds and, if desired, tertiary amines, preferably diethylethanolamine. Examples of appropriate tin compounds are dibutyltin dilaurate, dibutyltin diacetate and dibutyloxotin.

Compounds suitable for curing at elevated temperature, in addition, are blocked polyisocyanates, polycarboxylic acids and their anhydrides.

The copolymers according to the invention are particularly suitable for the production of high-solids, solvent-containing clearcoats. In addition, they are well suited to producing powder coatings, in conjunction with polycarboxylic anhydrides. The copolymers can be employed for reaction with polycarboxylic anhydrides and for the subsequent use of the resulting products as curing agents for various synthetic resins, especially epoxy resins. The use of the products prepared according to the invention together with specific partial esters of polycarboxylic acids, or with derivatives of polycarboxylic acids or their anhydrides or ester anhydrides, is of particular interest.

Examples of preferred polycarboxylic acid derivatives are polyanhydrides derived from at least tetrahydric carboxylic acids, with which polyanhydrides the products prepared according to the invention can be reacted. These systems are of particular advantage for cold curing, because of their high reactivity.

In coating compositions prepared using the copolymers according to the invention it is also possible for other auxiliaries and additives, conventional in coating technology, to be present. These include, in particular, catalysts, leveling agents, silicone oils, plasticizers such as phosphates and phthalates, pigments such as iron oxides, lead oxides, lead silicates, titanium dioxide, barium sulfate, zinc sulfide, phthalocyanine complexes, etc., and fillers such as talc, mica, kaolin, chalk, ground quartz, ground asbestos, ground slate, various silicic acids, silicates, etc., viscosity-controlling additives, flatting agents, UV absorbers and light stabilizers, antioxidants and/or peroxide scavengers, antifoams and/or wetting agents, active diluents and the like.

The coating compositions can be applied to any desired substrate by any known method, for example, by brushing, dipping, flow coating or using rollers or blades, but in particular by spraying. They may be applied under hot conditions and, if desired, can be brought into a form in which they are ready for application by the injection of supercritical solvents (e.g., $CO_2$). They can be used as binders for e.g. automotive repair fillers in combination with pigments, fillers and other common additives. Such binders are cured with isocyanate. After hardening, they are ground and polished and eventually coated. Automotive refinishes with excellent properties can be obtained with binders prepared using the copolymers according to the invention. These binders can be employed for the preparation of both intermediate coats and pigmented or unpigmented topcoats. Express reference is to be made to the preferential suitability of these binder combinations in two-component automotive refinishes and industrial coatings.

For this purpose the coating materials are generally cured within the temperature range from $-20°$ to $+100°$ C., preferably from $-10°$ to $+80°$ C. (moderate temperatures).

The invention is illustrated in more detail in the examples which follow. In the embodiment examples, all percentages are by weight unless expressly stated otherwise.

EXAMPLES

I. Preparation of the copolymers

In a reactor fitted with a stirrer, inert gas inlet, a heating and cooling system and an addition device, the glycidyl ester of an $\alpha,\alpha$-dialkylalkanemonocarboxylic acid [e.g., glycidyl ester of Versatic 10 or 5 acid (tradename: Cardura® E 10 or, respectively, Cardura® E 5, Shell Chemicals)] (in some cases in solvent or solvent mixtures) is initially charged and heated to the desired temperature under inert gas. Subsequently, over a period of 6 hours, the monomer mixture (in some cases in solvent or solvent mixtures) is metered in at a uniform rate, together or separately, with initiator or initiator mixtures (in some cases in solvent or solvent mixtures). Polymerization is subsequently carried out for 2 hours until a conversion of at least 95% has been reached.

If the solids content after polymerization is below 97.0%, then the batch is re-primed, either before or during the subsequent polymerization, with ⅟₁₀ of the initial quantity of initiator (with or without solvent), or the residual monomers (including fragments of initiator/solvent) are separated off in a vacuum distillation.

The copolymers are dissolved in suitable solvents or solvent mixtures.

All copolymers are filtered through an appropriate filtering device. The following copolymers are prepared. The precise batches in terms of parts by weight, reaction conditions and product characteristics can be taken from the tables which follow.

TABLE 1

Preparation and properties of copolymers

| Batch | Copolymer 1 | Copolymer 2 | Copolymer 3 |
|---|---|---|---|
| Glycidyl ester (Cardura ® E10) | 20.90 | 20.50 | 22.65 |
| Acrylic acid | 6.73 | 6.60 | 3.63 |
| Methacrylic acid | — | — | 4.37 |
| Hydroxyethyl methacrylate | 20.62 | 22.50 | 20.35 |
| Isobornyl acrylate | — | 28.65 | 14.30 |
| Isobornyl methacrylate | 25.05 | — | — |
| Methyl methacrylate | 5.64 | 3.75 | 11.46 |
| Styrene | 21.06 | 18.00 | 23.24 |
| Initiator | A | B | B |
|  | 1.80 | 1.51 | 1.50 |
| Polymerization temperature (°C.) | 170 | 185 | 175 |
| SC (%) after polymerization | 97.5 | 98.5 | 97.8 |
| SC (%) Sf (in butyl acetate) | 75.1 | 75.7 | 74.7 |
| Acid number (mg KOH/g SR) | 8.6 | 11.5 | 10.7 |
| Hydroxyl number (mg KOH/g SR) | 140 | 147 | 143 |
| Viscosity (mPa · s) 23° C. (Sf) | 9800 | 6170 | 11040 |
| Viscosity (mPa · s) 23° C. (50% strength in BuAc/xylene 1:1) | 51 | 48 | 69 |
| GPC (PS calibration) | | | |
| $<M_w>$ (g/mol) | 3310 | 4650 | 4640 |
| $<M_n>$ (g/mol) | 1580 | 1960 | 1930 |

TABLE 1-continued

Preparation and properties of copolymers

| Batch | Copolymer 1 | Copolymer 2 | Copolymer 3 |
|---|---|---|---|
| U = $<M_w>/<M_n>$ | 2.1 | 2.4 | 2.4 |
| Hazen color number (DIN 53995) | 50 | 42 | 61 |
| $T_g$ (DSC measurement, °C.) | 25 | 26 | 27 |
| Appearance | transparent | transparent | transparent |

SC: solids content, SR: solid resin Sf: supply form
$T_g$ glass transition temperature of the solid resin (binder)
Measurement: DSC-7 from Perkin Elmer, Überlingen, heating rate 10 K./min.
Initiators:
A: di-tert-amyl peroxide (Interox ® DTAP, Peroxid Chemie)
B: di-tert-butyl peroxide (Trigonox ® B, Akzo)
GPC: $<M_w>$, $<M_n>$ Millipore ® Waters Chromatography System 860 Pump: Model 590, RI detector: Model 410 Column packing: Waters Ultrastyragel 2 × LINEAR + 1 × 500 Å (Ångström)
Solvent: tetrahydrofuran at 40° C.
Flow rate: 1 ml/min, concentration: 1% strength based on solids content
Calibration: polystyrene (PSS, Mainz)
Determination of characteristics: acid number, hydroxyl number and viscosity (for standards see "Analytische Bestimmungsmethoden" [Analytical determination methods], brochure: Synthetic Resins Hoechst, 1982 edition; Hoechst AG, Frankfurt/Main)
Hazen color number according to DIN 53995 (LTM1, Dr. Lange GmbH, Berlin)
Copolymers 1 to 3 prepared have very low number-average molar masses and very low solution viscosities (Ubbelohde: 50% strength in BuAc/xylene, 1:1, 23° C.).
The glass transition temperatures are above room temperature (20° C.).

TABLE 2

Preparation and properties of copolymers

| Batch | Copolymer 4 | Copolymer 5 | Copolymer 6 | Copolymer 7 |
|---|---|---|---|---|
| Glycidyl ester (Cardura ® E10) | 23.25 | 22.68 | 21.42 | 24.09 |
| Acrylic acid | 7.48 | 7.30 | 6.90 | 7.76 |
| Hydroxyethyl methacrylate | 22.93 | 22.37 | 21.13 | 23.77 |
| 4-tert-Butyl methacrylate | 17.83 | — | — | — |
| Cyctohexyl methacrylate | — | 19.84 | — | — |
| 4-tert-Butyl-cyctohexyl acrylate | — | — | 24.28 | — |
| 2-Ethyhexyl acrylate | — | — | — | 14.83 |
| Methyl methacrylate | 6.27 | 6.12 | 5.78 | 6.50 |
| Styrene | 22.24 | 21.69 | 20.49 | 23.05 |
| Initiator | A | A | A | A |
|  | 1.98 | 1.93 | 1.83 | 2.06 |
| Polymerization temperature (°C.) | 175 | 175 | 175 | 175 |
| SC (%) after polymerization | 96.9 | 96.3 | 97.2 | 97.1 |
| after distillation | 98.1 | 97.3 | — | — |
| SC (%) Sf (in butyl acetate) | 74.8 | 74.9 | 75.4 | 73.7 |
| Acid number (mg KOH/g SR) | 30.4 | 9.1 | 9.3 | 9.6 |
| Hydroxyl number (mg KOH/g SR) | 165 | 147 | 141 | 154 |
| Viscosity (mPa · s) 23° C. (Sf) | 14450 | 9480 | 10940 | 6111 |
| Viscosity (mPa · s) 23° C. (50% strength in BuAc) | 71 | 47 | 56 | 43 |
| GPC (PS calibration) | | | | |
| $<M_w>$ (g/mol) | 6050 | 4030 | 4220 | 3540 |
| $<M_n>$ (g/mol) | 2520 | 1830 | 2010 | 1610 |
| U = $<M_w>/<M_n>$ | 2.4 | 2.2 | 2.1 | 2.2 |
| Hazen color number (DIN 53995) | 43 | 38 | 45 | 31 |
| $T_g$ (DSC measurement, °C.) | 24 | 22 | 24 | 21 |
| Appearance | transparent | transparent | transparent | transparent |

SC: solids content, SR: solid resin Sf: supply form
$T_g$ glass transition temperature of the solid resin (binder)
Measurement: DSC-7 from Perkin Elmer, Überlingen, heating rate 10 K./min.
Initiators:
A: di-tert-amyl peroxide (Interox ® DTAP, Peroxid Chemie)
B: di-tert-butyl peroxide (Trigonox ® B, Akzo)
GPC: $<M_w>$, $<M_n>$ Millipore ® Waters Chromatography System 860 Pump: Model 590, RI detector: Model 410 Column packing: Waters Ultrastyragel 2 × LINEAR + 1 × 500 Å (Ångströ)
Solvent: tetrahydrofuran at 40° C.
Flow rate: 1 ml/min, concentration: 1% strength based on solids content
Calibration: polystyrene (PSS, Mainz)
Determination of characteristics: acid number, hydroxyl number and viscosity (for standards see "Analytische Bestimmungsmethoden" [Analytical determination methods], brochure: Synthetic Resins Hoechst, 1982 edition; Hoechst AG, Frankfurt/Main)
Hazen color number according to DIN 53995 (LTM1, Dr. Lange GmbH, Berlin)
Copolymers 4 to 7 prepared have very low number-average molar masses and very low solution viscosities (Ubbelohde: 50% strength in BuAc, 23° C.).
The glass transition temperatures are above room temperature (20° C.).

TABLE 3

Preparation and properties of copolymers

| Batch | Copolymer 8 | Copolymer 9 |
|---|---|---|
| Glycidyl ester (Cardura ® E10) | 11.39 | 11.43 |
| Acrylic acid | — | 1.83 |
| Methacrylic acid | 4.37 | 2.19 |
| Hydroxypropyl methacrylate | 30.57 | 30.68 |
| 4-tert-Butyl-cyclohexyl methacrylate | 15.19 | 15.25 |
| Methyl methacrylate | 6.63 | 6.65 |
| Styrene | 31.85 | 31.97 |
| Initiator | B | B |
|  | 1.50 | 1.50 |
| Polymerization temperature (°C.) | 185 | 185 |
| SC (%) | | |
| after polymerization | 96.4 | 97.8 |
| after distillation | 98.0 | — |
| SC (%) Sf (in butyl acetate) | 75.3 | 75.5 |
| Acid number (mg KOH/g SR) | 6.1 | 6.6 |
| Hydroxyl number mg KOH/g SR) | 147 | 145 |
| Viscosity (mPa · s), 23° C. (Sf) | 5440 | 8400 |
| Viscosity (mPa · s), 23°C. (50% strength in BuAc) | 31 | 34 |
| GPC (PS calibration) | | |
| $<M_w>$ (g/mol) | 2900 | 3180 |
| $<M_n>$ (g/mol) | 1340 | 1430 |
| U = $<M_w>/<M_n>$ | 2.2 | 2.2 |
| Hazen color number (DIN 53995) | 44 | 35 |

TABLE 3-continued

Preparation and properties of copolymers

| Batch | Copolymer 8 | Copolymer 9 |
|---|---|---|
| $T_g$ (DSC measurement, °C.) | 24 | 21 |
| Appearance | transparent | transparent |

SC: solids content, SR: solid resin Sf: supply form
$T_g$ glass transition temperature of the solid resin (binder)
Measurement: DSC-7 from Perkin Elmer, Überlingen, heating rate 10 K./min.
Initiators:
A: di-tert-amyl peroxide (Interox ® DTAP, Peroxid Chemie)
B: di-tert-butyl peroxide (Trigonox ® B, Akzo)
GPC: $<M_w>$, $<M_n>$ Millipore ® Waters Chromatography System 860 Pump: Model 590, RI detector: Model 410 Column packing: Waters Ultrastyragel 2 × LINEAR + 1 × 500 Å (Ångströ)
Solvent: tetrahydrofuran at 40° C.
Flow rate: 1 ml/min, concentration: 1% strength based on solids content
Calibration: polystyrene (PSS, Mainz)
Determination of characteristics: acid number, hydroxyl number and viscosity (for standards see "Analytische Bestimmungsmethoden" [Analytical determination methods], brochure: Synthetic Resins Hoechst, 1982 edition; Hoechst AG, Frankfurt/Main)
Hazen color number according to DIN 53995 (LTM1, Dr. Lange GmbH, Berlin)
Copolymers 8 and 9 prepared have very low number-average molar masses and very low solution viscosities (Ubbelohde: 50% strength in BuAc, 23° C.). The glass transition temperatures are above room temperature (20° C.).

II. Preparation of the coating materials

To prepare the curable coating compositions according to the invention, the components—comprising a copolymer or a mixture of two or more such copolymers or other copolymers, with the auxiliaries and additives, solvents and crosslinking agents in the mixing weight ratio described (Tables 4–6)—are mixed and are adjusted using further diluent to the spray viscosity of from 20 to 21 seconds with a flow cup (DIN 52 211, 4 mm, 23° C.). For components of low viscosity this can be carried out in bulk, with heating to higher temperatures being carried out if desired. Products of higher viscosity are dissolved or dispersed, prior to mixing, in the diluents mentioned, unless the curable mixtures are to be employed as a powder coating.

In the case of pigmented systems a pigment paste is first produced in one dispersion step from the appropriate pigments together with the copolymer 1 or a mixture of two or more such or other copolymers, or an appropriate, specific grinding resin, in a dispersion apparatus of appropriate construction. This paste is mixed and is made up with the addition of further diluents or additives typical for coatings (Table 7). If desired, further binder based on the copolymers according to the invention, or a different resin which is compatible with the other components of the coating system, can be admixed.

The pot life and the properties of the resulting films depend in this context on the process conditions, in other words on the nature and quantity of the starting materials, the metering of the catalyst, the temperature control, etc. Although curing is generally carried out discontinuously, it is also within the scope of the invention to mix the components and carry out the reaction continuously, for example, using an automatic coating apparatus.

II. 1. Clearcoats

TABLE 4

Preparation of high-solids clearcoats

| Batch | Copolymers 1 | 2 | 3 |
|---|---|---|---|
| Appearance | transparent | transparent | transparent |
| SC % | 75.1 | 75.7 | 74.7 |
| OH number/% OH | 140/4.2 | 147/4.4 | 143/4.3 |
| Visc. mPa · s (50%) | 51 | 48 | 69 |
| Binder | 82 | 82 | 82 |
| Tinuvin ® 292 | 0.5 | 0.5 | 0.5 |
| Tinuvin ® 1130 | 1.5 | 1.5 | 1.5 |
| Si oil Lo 50%, 10% strength | 1 | 1 | 1 |
| Solvesso ® 100 | 1.5 | 1.5 | 1.5 |
| Xylene | 2.5 | 2.5 | 2.5 |
| BuAc | 11 | 11 | 11 |
| Desmodur ® N 3390 | 32.7 | 34.3 | 33.5 |
| Flow cup (Din 53 211) (seconds) | 21 | 21 | 21 |
| Coating designation | Coating material 1 | Coating material 2 | Coating material 3 |

Tinuvin ® 292 "HALS" (Ciba Geigy, Basle)
Tinuvin ® 1130 UV absorber (Ciba Geigy, Basle)
Si oil LO 50% leveling agent: Silicone oil (Wacker Chemie GmbH, Burghausen)
Desmodur ® N 3390: Polyisocyanate containing isocyanurate groups (Bayer AG, Leverkusen)
BuAc: Butyl acetate

TABLE 5

Preparation of high-solids clearcoats

| Batch | Copolymers 4 | 5 | 6 | 7 |
|---|---|---|---|---|
| Appearance | transparent | transparent | transparent | transparent |
| SC % | 74.8 | 74.9 | 75.4 | 73.7 |
| OH number/% OH | 165/5.0 | 147/4.4 | 141/4.2 | 154/4.6 |
| Visc. mPa · s (50%) | 71 | 47 | 56 | 43 |
| Binder | 82 | 82 | 82 | 82 |
| Tinuvin ® 292 | 0.5 | 0.5 | 0.5 | 0.5 |
| Tinuvin ® 1130 | 1.5 | 1.5 | 1.5 | 1.5 |
| Si oil Lo 50%, 10% strength | 1 | 1 | 1 | 1 |
| Solvesso ® 100 | 1.5 | 1.5 | 1.5 | 1.5 |
| Xylene | 2.5 | 2.5 | 2.5 | 2.5 |
| BuAc | 11 | 11 | 11 | 11 |
| Desmodur ® N 3990 | 39.0 | 34.3 | 32.7 | 35.9 |
| Flow cup (Din 53 211 seconds) | 21 | 21 | 21 | 21 |
| Coating designation | Coating material 4 | Coating material 5 | Coating material 6 | Coating material 7 |

Tinuvin ® 292 "HALS" (Ciba Geigy, Basle)
Tinuvin ® 1130 UV absorber (Ciba Geigy, Basle)
Si oil LO 50% leveling agent: Silicone oil (Wacker Chemie GmbH, Burghausen)
Desmodur ® N 3390: Polyisocyanate containing isocyanurate groups (Bayer AG, Leverkusen)
BuAc: Butyl acetate

TABLE 6

Preparation of high-solids clearcoats

| | Copolymers | |
|---|---|---|
| Batch | 8 | 9 |
| Appearance | transparent | transparent |
| SC % | 75.3 | 75.5 |
| OH number/% OH | 147/4.4 | 145/4.4 |
| Visc. mPa · s (50%) | 31 | 34 |
| Binder | 82 | 82 |
| Tinuvin ® 292 | 0.5 | 0.5 |
| Tinuvin ® 1130 | 1.5 | 1.5 |
| Si oil Lo 50%, 10% strength | 1 | 1 |
| Solvesso ® 100 | 1.5 | 1.5 |
| Xylene | 2.5 | 2.5 |
| BuAc | 11 | 11 |
| Desmodur ® N 3390 | 34.3 | 34.3 |
| Flow cup (Din 53 211) (seconds) | 21 | 21 |
| Coating designation | Coating material 8 | Coating material 9 |

Tinuvin ® 292 "HALS" (Ciba Geigy, Basle)
Tinuvin ® 1130 UV absorber (Ciba Geigy, Basle)
Si oil LO 50% leveling agent: Silicone oil (Wacker Chemie GmbH, Burghausen)
Desmodur ® N 3390: Polyisocyanate containing isocyanurate groups (Bayer AG, Leverkusen)
BuAc: Butyl acetate II. 2. Pigmented coating materials

TABLE 7

Preparation of white paints

| Binder | Copolymer 1 | Comparison: Standard Macrynal ® SM515 |
|---|---|---|
| SC % | 75.1 | 70 |
| OH number/% OH | 140/4.2 | 150/4.5 |
| Binder | 53 | 55 |
| TiO₂ - 2310 | 29.2 | 29.2 |
| Bentone ® 34 (10% paste in xylene) | 2.5 | 2.5 |
| Additol ® XL 260 | 1 | 1 |
| Si oil LO 50%/10% | 1 | 1 |
| Solvesso ® 100 | 1.5 | 1.5 |
| BuAc | 6.2 | 5.2 |
| Xylene | 2.5 | 2.5 |
| Methoxyproply acetate | 3.1 | 2.1 |
| Desmodur ® 3390 | 21 | 21.9 |
| Binder:pigment | 1:0.5 | 1:0.5 |
| Flow cup (DIN 53211) (seconds) | 21 | 21 |
| Coating Designation | Coating material 10 | Coating material 11 |

TiO₂ - 2310 White pigment (Kronos Titan GmbH, Leverkusen)
Bentone ® 34 Antideposition agent (Kronos Titan GmbH, Leverkusen)
Additol ® XL 260 (Vianova GmbH, Graz)
Si oil LO 50% leveling agent: Silicone oil (Wacker Chemie GmbH, Burghausen)
Desmodur ® N 3390: Polyisocyanate containing isocyanurate groups (Bayer AG, Leverkusen)
BuAc: Butyl acetate
Standard system: "High-Solids" binder Macrynal ® SM 515 from Hoechst AG, Frankfurt/Main II. 3. Preparation of automotive repair filler

TABLE 8

Filler formulation

| Binder | Copolymer 1 | Comparison: Standard Macrynal ® SM513 |
|---|---|---|
| SC | 70% | 60% |
| OH number/% OH | 140/4.2 | 110–120/ approx. 3.5 |
| Binder | 18 | 22.6 |
| Butyl acetate | 15.7 | 13.7 |
| Methoxyproply acetate | 12.4 | 10.4 |
| Bentone ® 34 10% | 5 | 5 |
| Additol ® XL 270 | 0.5 | 0.5 |
| Bayferrox ® 316 (black) | 0.2 | 0.2 |
| Bayferrox ® 3920M (yellow) | 0.3 | 0.3 |
| Zn oxide NT/S | 2.2 | 2.2 |
| Talc AT ex | 6 | 6 |
| TiO₂ 2059 | 10.4 | 10.4 |
| Kaolin W | 18.4 | 18.4 |
| Zn phosphate ZP 10 | 8.5 | 8.5 |
| BuAc | 2.4 | 1.8 |
| | 100 | 100 |
| Desmodur ® | 7.7 | 7.7 |
| Binder:pigment | 1:2.5 | 1:2.5 |
| Flow cup (DIN 53211) (seconds) | 21 | 21 |
| Coating Designation | Coating material 12 | Coating material 13 |

Bentone ® 34 Antideposition agent (Kronos Titan GmbH, Leverkusen)
Additol ® XL 270 (Vianova GmbH, Graz)
Bayferrox ® 316 (black) (Bayer AG, Leverkusen)
Bayferrox ® 3920 M (yellow) (Bayer AG, Leverkusen)
Zn oxide NT/S (Dr. Hans Heubach GmbH, Langelsheim)
Zn phosphate (Dr. Hans Heubach GmbH, Langelsheim)
Talc AT ex (Norwegian Talc Deutschland, Bad Soden-Salmünster)
TiO₂ 2059 White pigment (Kronos Titan GmbH, Leverkusen)
Kaolin W (C.H. Erbslöh, Düsseldorf)
Desmodur ® N 75% Polyisocyanate (Bayer AG, Leverkusen)
Comparison: Standard Macrynal ® SM 513: Binder for topcoats and fillers from Hoechst AG, Frankfurt/Main III. Performance testing III. 1. and 2. Performance testing of high-solids clearcoats and pigmented coating materials The coating systems prepared in II. 1. and 2. were applied to cleaned glass panels using a 100 μm doctor blade and were tested under the conditions of air drying and of forced drying (45 minutes at 60° C.).

TABLE 9

Performance testing of high-solids clearcoats

| Coating Designation | Coating material 1 | Coating Material 2 | Coating material 3 |
|---|---|---|---|
| Appearance | transparent | transparent | transparent |
| Initial/pot life | >8 h | >8 h | >8 h |
| Dust-dry time | 15' | 22' | 12' |
| Tack-free drying | 4 h | 4.5 h | 4 h |
| SC-1 h 125° C. (%) | 62.5 | 65.0 | 61.8 |
| Pendulum hardness after | | | |
| 24 h | 25 | 59 | 34 |
| 2 d | 101 | 105 | 118 |
| 4 d | 182 | 186 | 187 |
| 10 d | 217 | 198 | 211 |
| Premium-grade gasoline after 10 d in min | >30' | 20' | >30' |

TABLE 9-continued

Performance testing of high-solids clearcoats

| Coating Designation | Coating material 1 | Coating Material 2 | Coating material 3 |
|---|---|---|---|
| Pendulum hardness after 45' 60° C. drying | | | |
| 24 h | 59 | 136 | 77 |
| 2 d | 133 | 177 | 150 |
| 4 d | 196 | 207 | 193 |
| 7 d | 215 | 210 | 217 |
| 45' 60° C. drying premium-grade gasoline after 7 d in min | >30' | >30' | >30' |

SC Solids content determined in accordance with DIN 53 216

Pendulum hardness is determined according to König after drying for 24 hours (h), 2 days (d), etc., and after forced drying at 60° C. for 45 minutes and subsequent storage at room temperature over 24 hours, 2 days, et. Gasoline resistance is determined with a soaked cotton pad which is applied to a coated surface after drying at room temperature for 10 days or at 60° C. for 45 minutes and subsequent storage at room temperature for 7 days. The time in minutes is recorded during which no change in the surface appearance is observed.

TABLE 10

Performance testing of high-solids clearcoats

| Coating designation | Coating Material 4 | Coating Material 5 | Coating Material 6 | Coating Material 7 |
|---|---|---|---|---|
| Appearance | transparent | transparent | transparent | transparent |
| Initial/pot life | >8 h | >8 h | >8 h | >8 h |
| Dust-dry time | 10' | 19' | 12' | 23' |
| Tack-free drying | 3.5 h | 4.5 h | 4.5 h | 5 h |
| SC-1 h 125° C. | 61.0 | 63.1 | 61.9 | 65.5 |
| Pendulum hardness after | | | | |
| 24 h | 62 | 48 | 38 | 32 |
| 2 d | 148 | 107 | 116 | 102 |
| 4 d | 176 | 268 | 166 | 148 |
| 10 d | 221 | 203 | 211 | 192 |
| Premium-grade gasoline after 10 d in min | >30' | >30' | >30' | >30' |
| Pendulum hardness after 45' 60° C. drying | | | | |
| 24 h | 92 | 66 | 83 | 56 |
| 2 d | 172 | 123 | 152 | 112 |
| 4 d | 205 | 209 | 198 | 159 |
| 7 d | 223 | 218 | 220 | 202 |
| 45' 60° C. drying premium-grade gasoline after 7 d in min | >30' | >30' | >30' | >30' | see above

TABLE 11

Performance testing of high-solids clearcoats

| Coating Designation | Coating material 8 | Coating Material 9 |
|---|---|---|
| Appearance | transparent | transparent |
| Initial/pot life | >8 h | >8 h |
| Dust-dry time | 18' | 21' |
| Tack-free drying | 4.5 h | 4.5 h |
| SC-1 h 125° C. (%) | 64.0 | 65.3 |
| Pendulum hardness after | | |
| 24 h | 37 | 42 |
| 2 d | 111 | 113 |
| 4 d | 152 | 156 |
| 10 d | 213 | 205 |
| Premium-grade gasoline after 10 d in min | >30' | >30' |
| Pendulum hardness after 45' 60° C. drying | | |
| 24 h | 51 | 49 |
| 2 d | 137 | 128 |
| 4 d | 181 | 167 |
| 7 d | 220 | 213 |
| 45' 60° C. drying premium-grade gasoline after 7 d in min | >30' | >30' | see above

SUMMARY

The coating compositions according to the invention, uncatalyzed in clearcoats formulated as in practice, have very high solids contents of coating material, high film hardnesses and resistances, with a high drying rate and rapid through-drying.

The topcoat holdout and the processing of the coating material match the properties of the standard systems.

Standard systems: High-solids binder MaCrynal® SM 515, Macrynal® SM 516 from Hoechst A. G., Frankfurt/Main

TABLE 12

Performance testing of the white paints (pigmented coating materials)

| Coating Designation | Coating material 10 | Coating Material 11 (comparison) |
|---|---|---|
| Initial/pot life | 21"/>24 h | 21"/24 h gel. |
| Dust-dry time | 15' | 10' |
| Tack-free drying | 3.5 h | 2.5 h |
| SC-1 h 125° C. (%) | 65.3 | 59.2 |
| Pendulum hardness after | | |
| 24 h | 71 | 68 |
| 2 d | 121 | 99 |
| 4 d | 141 | 135 |
| 5 d | 167 | 164 |
| 7 d | 192 | 188 |
| 10 d | 212 | 207 |
| Premium-grade gasoline after 10 d in min | >30 | >30 |
| Pendulum hardness after 45' 60° C. drying | | |
| 24 h | 113 | 121 |
| 2 d | 171 | 170 |
| 3 d | 192 | 186 |
| 5 d | 201 | 198 |

TABLE 12-continued

Performance testing of the white paints
(pigmented coating materials)

| Coating Designation | Coating material 10 | Coating Material 11 (comparison) |
|---|---|---|
| Premium-grade gasoline after 5 d in min | >30 | >30 |

Pendulum hardnesses in accordance with König
SC Solids content determined in accordance with DIN 53 216
" seconds, ' minutes, h: hours, d: days

SUMMARY

The binders according to the invention, in white paint formulations conforming to those found in practice, exhibit an advantageously extended pot life with a markedly increased solids content of coating material.

Drying is delayed only slightly with regard to the standard resin system, whereas the development of film hardness is to be regarded as equivalent or better both at room temperature drying and with forced drying. The chemical resistance is of an equally high level.

III. 3. Performance testing of the fillers

The fillers formulated as in II. 3. Table 8 are applied to cleaned glass panels using a 200 μm doctor blade and tested under the condition of air drying.

TABLE 13

Performance testing of the fillers

| Coating Designation | Coating material 12 | Coating material 13 (comparison) |
|---|---|---|
| Pot life | 4 h | 3 h |
| SC-1 h 125° C. | 64 | 58 |
| Dry sandability after 16 h | very good | very good |
| Solvent resistance butyl acetate 1 min after 16 h | satisfactory | satisfactory | h Hours
SC Solids content determined in accordance with DIN 53 216

SUMMARY

Using one of the binders according to the invention, it is possible to formulate an automotive repair filler with a high solids content and a long processing time.

What is claimed is:

1. A copolymer having a low solution viscosity of less than 2000 mPa•s in 50% strength solution which is prepared by a bulk copolymerization process wherein a first component (A) is charged initially, and at least two olefinically unsaturated copolymerizable monomers (B) are added and polymerized, at least one of which contains at least one functional group which remains after the polymerization, and at least one of which is sterically hindered, wherein the compound (A) contains a functional group that reacts with the functional group in (B) to form a chemical bond, and wherein the copolymer is modified by reaction with one or more isocyanate compounds that contain from 0.8 to 1.5 free NCO groups per molecule.

2. A copolymer as claimed in claim 1, comprising (A) from 5 to 50% by weight of the copolymer of one or more glycidyl esters of aliphatic, saturated monocarboxylic acids containing a tertiary or quaternary α carbon atom, and (B) from 95 to 50% by weight of the copolymer of at least two olefinically unsaturated, copolymerizable monomers, of which at least one contains at least one COOH group and at least one is sterically-hindered.

3. A copolymer as claimed in claim 1, wherein the sterically-hindered monomers are olefinically-unsaturated compounds having a branched carbon chain and/or a cyclic structure.

4. A copolymer as claimed in claim 2, wherein the olefinically unsaturated monomers B include the monomers, (B1) one or more olefinically unsaturated monomers having at least one COOH group, and (B2) one or more olefinically-unsaturated, sterically-hindered monomers, and optionally one or more of components (B3) to (B5), wherein (B3) one or more hydroxyalkyl esters of α,β-unsaturated carboxylic acids, (B4) one or more esters of an α,β-unsaturated carboxylic acid with a monohydric aliphatic alcohol of 1 to 20 carbon atoms, and (B5) one or more olefinically-unsaturated compounds which are not included in (B1), (B2), (B3), or (B4).

5. A copolymer as claimed in claim 1, wherein the sterically-hindered monomers comprise esters of acrylic or methacrylic acid with branched or cyclic aliphatic alcohols.

6. A copolymer as claimed in claim 1, which has an OH number of from 40 to 250 mg of KOH/g, a number-average molar mass of less than 5000 g/mol, and a solution viscosity of from 10 to 2000 mPa•s (measured in 50% strength solution at 23° C.).

7. A copolymer as claimed in claim 1, which has a glass transition temperature above 20° C. at a heat-up rate of 10 K/min.

8. A copolymer as claimed in claim 1, which has an acid number of at least 2 mg of KOH/g.

9. A copolymer as claimed in claim 1, which is produced by a process comprising the steps of (a) charging component (A) to a vessel, and (b) adding component (B) and a free-radical initiator which polymerizes and reacts with (A) to form the copolymer.

10. A copolymer as claimed in claim 9, wherein the polymerization is carried out in the presence of no more than 20% by weight of solvent based on the total weight of the starting materials.

11. A copolymer as claimed in claim 9, wherein the process is carried out in the absence of solvents.

12. A copolymer as claimed in claim 9, wherein the polymerization is conducted at from 100° to 210° C.

13. A copolymer as claimed in claim 9, wherein the initiator comprises a dialkyl peroxide.

14. A coating composition as claimed in claim 1, which is an intermediate coating or a pigmented or unpigmented topcoat.

15. A powder coating composition comprising a copolymer as claimed in claim 1.

16. A coating composition comprising a copolymer having a low solution viscosity of less than 2000 mPa•s in 50% strength solution which is prepared by a bulk copolymerization process wherein a first component (A) is charged initially, and at least two olefinically unsaturated copolymerizable monomers (B) are added and polymerized, at least one of which contains at least one functional group which remains after the polymerization, and at least one of which is sterically hindered, wherein the compound (A) contains a functional group that reacts with the functional group in (B) to form a chemical bond, wherein the copolymer is modified by reaction with one or more isocyanate compounds that contains from 0.8 to 1.5 free NCO groups per molecule, and wherein the copolymer acts as a binder and is cured by crosslinking with one or more polyisocyanate.

17. A substrate coated with a coating composition as claimed in claim 16.

18. A copolymer as claimed in claim 1, which is cured.

19. A copolymer as claimed in claim 18, which is cured by an amino resin, a phenolic resin, a polyisocyanate, or a compound which contains one or more anhydride group.

20. A copolymer as claimed in claim 19, wherein the copolymer is cured by the reaction of a polyisocyanate with hydroxy groups of the copolymer.

\* \* \* \* \*